US012705421B2

(12) United States Patent
Dai et al.

(10) Patent No.: US 12,705,421 B2
(45) Date of Patent: Aug. 11, 2026

(54) FULL ATTENTION WITH SPARSE COMPUTATION COST

(71) Applicant: Google LLC, Mountain View, CA (US)

(72) Inventors: Hanjun Dai, San Jose, CA (US); Bo Dai, San Jose, CA (US); Hongyu Ren, Stanford, CA (US); Dale Eric Schuurmans, Edmonton (CA); Zihang Dai, Cupertino, CA (US); Mengjiao Yang, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 1037 days.

(21) Appl. No.: 17/860,691

(22) Filed: Jul. 8, 2022

(65) Prior Publication Data

US 2023/0022151 A1 Jan. 26, 2023

Related U.S. Application Data

(60) Provisional application No. 63/220,063, filed on Jul. 9, 2021.

(51) Int. Cl.
*G06N 20/00* (2019.01)
*G06F 40/20* (2020.01)

(52) U.S. Cl.
CPC ............. *G06F 40/20* (2020.01); *G06N 20/00* (2019.01)

(58) Field of Classification Search
CPC .......... G06N 20/00; G06N 3/045; G06N 3/08; G06F 40/20; G06F 40/216; G06F 40/284; G06F 40/30; G06F 40/44
See application file for complete search history.

(56) References Cited

U.S. PATENT DOCUMENTS

2020/0026760 A1* 1/2020 Chiu ..................... G06F 16/345
2020/0104681 A1* 4/2020 Li ......................... G06F 16/903
2022/0108212 A1* 4/2022 Zhai ....................... G06F 17/14

OTHER PUBLICATIONS

Ren, "Combiner: Full Attention Transformer with Sparse Computation Cost", Jul. 12, 2021. (Date precludes usage. Provided as NPL to applicants' invention). (Year: 2021).*
Brown et al., "Language Models Are Few-Shot Learners", arXiv:2005.14165v4, Jul. 22, 2020, 75 pages.
Chen et al., "PixelSnail: An Improved Autoregressive Generative Model", arXiv:1712.09763v1, Dec. 28, 2017, 6 pages.

(Continued)

*Primary Examiner* — Dave Misir
(74) *Attorney, Agent, or Firm* — DORITY & MANNING P.A.

(57) ABSTRACT

The present disclosure is directed to machine learning model architectures which provide full attention capability in each attention head while maintaining low computation and memory complexity. Specifically, according to one aspect of the present disclosure, example attention models provided herein can treat the self-attention mechanism as a conditional expectation over embeddings at each location and approximate the conditional distribution with a structured factorization. Each location can attend to all other locations, either via direct attention, or through indirect attention to group representations, which are again conditional expectations of embeddings from corresponding local regions.

19 Claims, 5 Drawing Sheets

(56) References Cited

OTHER PUBLICATIONS

Chen et al., "The Best of Both Worlds: Combining Recent Advances in Neural Machine Translation", arXiv:1804.09849v2, Apr. 27, 2018, 12 pages.
Child et al., Generating Long Sequences with Sparse Transformers, arXiv:1904.10509v1, Apr. 23, 2019.
Choromanski et al., "Rethinking Attention with Performers", arXiv:2009.14794v3, Mar. 9, 2021, 38 pages.
Dai et al., "Transformer-XL: Attentive Language Models Beyond a Fixed-Length Context", arXiv:1901.02860v3, Jun. 2, 2019, 20 pages.
Devlin et al., "Bert: Pre-Training of Deep Bidirectional Transformers for Language Understanding", arXiv:1810.04805v2, May 24, 2019, 16 pages.
Dong et al., "Speech-Transformer: A No-Recurrence Sequence-to-Sequence Model for Speech Recognition", IEEE International Conference on Acoustics, Speech and Signal Processing, Apr. 2018, pp. 5884-5888, 5 pages.
Dosovitskiy et al., "An Image is Worth 16 x16 Words: Transformers for Image Recognition at Scale", arXiv:2010.11929v2, Jun. 3, 2021, 22 pages.
Guo et al., "Wiki-40B: Multilingual Language Model Dataset", 12th Conference on Language Resources and Evaluation, Marseille, France, May 11-16, 2020, pp. 2440-2452, 13 pages.
Ho et al., "Axial Attention in Multidimensional Transformers", arXiv:1912.12180v1, Dec. 20, 2019, 11 pages.
Huang et al., "CCNet: Criss-Cross Attention for Semantic Segmentation", arXiv:1811.11721v2, Jul. 9, 2020, 13 pages.
Huang et al., "Music Transformer: Generating Music with Long-Term Structure", arXiv:1809.04281v3, Dec. 12, 2018, 14 pages.
Jun et al., "Distribution Augmentation for Generative Modeling", 37th International Conference on Machine Learning, Vienna, Austria, vol. 119, 2020, 14 pages.
Kanade et al., "Learning and Evaluating Contextual Embedding of Source Code", arXiv:2001.00059v3, Aug. 17, 2020, 21 pages.
Katharopoulos et al., "Transformers are RNNs: Fast Autoregressive Transformers with Linear Attention", arXiv:2006.16236v3, Aug. 31, 2020, 17 pages.
Kingma et al., "Glow: Generative Flow with Invertible 1x1 Convolutions", arXiv:1807.03039v2, Jul. 10, 2018, 15 pages.
Kitaev et al., "Reformer: The Efficient Transformer", arXiv:2001.04451v2, Feb. 18, 2020, 12 pages.
Lan et al., "Albert: A Lite Bert for Self-Supervised Learning of Language Representations", arXiv:1909.11942v6, Feb. 9, 2020, 17 pages.
Li et al., "Enhancing the Locality and Breaking the Memory Bottleneck of Transformer on Time Series Forecasting", arXiv:1907.00235v3, Jan. 3, 2020, 14 pages.
Liu et al., "Roberta: A Robustly Optimized Bert Pretraining Approach", arXiv:1907.11692v1, Jul. 26, 2019, 13 pages.
Madani et al., "Progen: Language Modeling for Protein Generation", arXiv:2004.03497v1, Mar. 8, 2020, 17 pages.
Menick et al., "Generating High Fidelity Images with Subscale Pixel Networks and Multidimensional Upscaling", arXiv:1812.01608v1, Dec. 4, 2018. 15 pages.
Parmar et al., "Image Transformer", arXiv:1802.05751v3, Jun. 15, 2018, 10 pages.
Peng et al., "Random Feature Attention", arXiv:2103.02143v2, Mar. 19, 2021, 19 pages.
Rae et al., "Compressive Transformers for Long-Range Sequence Modelling", arXiv:1911.05507v1, Nov. 13, 2019, 19 pages.
Raffel et al., "Exploring the Limits of Transfer Learning with Unified Text-to-Text Transformer" arXiv:1910.10683v3. Jul. 28, 2019, 67 pages.
Rabimi et al., "Random Features for Large-Scale Kernel Machines", 20th International Conference on Neural Information Processing Systems, Dec. 2007, pp. 1177-1184, 8 pages.
Reed et al., "Parallel Multiscale Autoregressive Density Estimation", arXiv:1703.03664v1, Mar. 10, 2017, 16 pages.
Roy et al., "Efficient Content-Based Sparse Attention with Routing Transformers", arXiv:2003.05997v5, Oct. 24, 2020, 24 pages.
Salimans et al., "PixelCNN++: Improving the PixelCNN with Discretized Logistic Mixture Likelihood and Other Modifications", arXiv:1701.05517v1, Jan. 19, 2017, 10 pages.
Si et al., "Memory Efficient Kernel Approximation", Journal of Machine Learning Research, vol. 18, 2017, pp. 1-32, 32 pages.
Tay et al., "Long Range Arena: A Benchmark for Efficient Transformers", arXiv:2011.04006v1, Nov. 8, 2020, 16 pages.
Van Oord et al., "Pixel Recurrent Neural Networks", In International Conference on Machine Learning (ICML), 2016.
Vaswani et al., "Attention is All You Need", arXiv:1706.03762v5, Dec. 6, 2017, 15 pages.
Wang et al., "Linformer: Self-Attention with Linear Complexity", arXiv:2006.04768v3, Jun. 14, 2020, 12 pages.
Yang et al., "Breaking the Softmax Bottleneck: A High-Rank RNN Language Model", arXiv:1711.03953v4, Mar. 2, 2018, 18 pages.
Yang et al., "XLNet: Generalized Autoregressive Pretraining for Language Understanding", arXiv:1906.08237v2, Jan. 2, 2020, 18 pages.
Yun et al., "O(n) Connections are Expressive Enough: Universal Approximability of Sparse Transformers", arXiv:2006.04862v2, Dec. 19, 2020, 31 pages.
Zaheer et al., "Deep Sets", arXiv:1703.06114v3, Apr. 14, 2018, 29 pages.
Zaheer, et al., "Big Bird: Transformers for Longer Sequences", arXiv:2007.14062v2, Jan. 8, 2021, 42 pages.
Zhuoran et al., "Factorized attention: Self-Attention with Linear Complexities", arXiv:1812.01243v1, Dec. 4, 2018, 15 pages.

* cited by examiner

FULL ATTENTION WITH SPARSE COMPUTATION COST

RELATED APPLICATIONS

This application claims priority to and the benefit of U.S. Provisional Patent Application No. 63/220,063, filed Jul. 9, 2021. U.S. Provisional Patent Application No. 63/220,063 is hereby incorporated by reference in its entirety.

FIELD

The present disclosure relates generally to machine learning. More particularly, the present disclosure relates to a machine-learned attention model that provides a full attention mechanism with sparse computational cost.

BACKGROUND

The Transformer is a powerful neural network architecture that has demonstrated state-of-the-art performance in machine translation and many other natural language processing (NLP) tasks via pretraining, using either unidirectional language modeling or bidirectional language modeling. It and its variants have also achieved excellent results in other domains like image recognition, code understanding, speech recognition, protein, music, and image generative modeling.

The core component of Transformer and other attention-based models is the attention mechanism, which computes dependencies between all pairs of positions in a sequence. However, for a sequence of length L, the expressiveness of pairwise attention comes at a quadratic cost $\mathcal{O}(L^2)$ in both time and memory consumption. This makes the vanilla Transformer prohibitive for applications that involve long sequences, including high-resolution images, protein sequences, or raw speech signals, where the sequence length L is often larger than 10,000.

Recently, there have been several attempts to scale up attention to long sequences. A popular class of methods sparsifies the attention matrix with different sparsity patterns, including local window, local+stride, log-sparse, axial, or learnable patterns through hashing or clustering. Sparse attention enjoys sub-quadratic cost, but is lossy in capturing all-pair relationships. Generally, sparse attention requires more layers to achieve full autoregressive or bidirectional dependencies (or receptive fields) for each location in a long sequence.

Alternatively, another line of research has tried to achieve scalability with an explicit low-rank assumption on the attention matrix or by using explicit feature maps of some kernels. However these explicit low dimensional approximations can be too restricted for the potentially full rank attention matrix, which uses exponential kernels that are effectively infinite dimensional. As one example, the Performer is among the first works that attempts to approximate regular full-rank attention with the random feature trick. However such random-feature based approaches require many more bases to better approximate the exponential kernel, and empirically it has been found to produce inferior results in some sequence modeling tasks, such as density estimation.

Thus, attention-based models such as Transformers provide a class of expressive architectures that are extremely effective for sequence modeling. However, the key limitation of Transformers is their quadratic memory and time complexity $\mathcal{O}(L^2)$ with respect to the sequence length in attention layers, which restricts application in extremely long sequences. Most existing approaches leverage sparsity or low-rank assumptions in the attention matrix to reduce cost, but sacrifice expressiveness.

SUMMARY

Aspects and advantages of embodiments of the present disclosure will be set forth in part in the following description, or can be learned from the description, or can be learned through practice of the embodiments.

One general aspect includes a computing system for performing an attention mechanism with reduced computational requirements. The computing system also includes one or more processors. The system also includes one or more non-transitory computer-readable media that collectively store a machine-learned attention model configured to receive and process a model input to generate a model output, where the machine-learned attention model may include one or more attention layers, where at least one of the attention layers may include one or more attention heads, and where at least one of the attention heads is configured to: receive a sequence of input data elements; and apply a structured attention pattern to the sequence of input data elements to generate a sequence of output data elements. For each input data element in the sequence of input data elements, the structured attention pattern can specify one or more locations of direct expectation and one or more groups of locations of local expectation. For each of the one or more groups of locations with local expectation, the at least one of the attention heads is configured to: determine a single group probability for the group of locations; and determine an individual local expectation for each location in the group of locations. Other embodiments of this aspect include corresponding computer systems, apparatus, and computer programs recorded on one or more computer storage devices, each configured to perform the actions of the methods.

Implementations may include one or more of the following features. The computing system where the structured attention pattern may include a full attention pattern that has a support that covers an entirety of the sequence of input data elements. The at least one of the attention heads may be configured to re-use the individual local expectation for each location in the group of locations when applying the structured attention pattern for two or more different input data elements in the sequence of input data elements. The sequence of input data elements may include a sequence of input embeddings. The structured attention pattern can specify a plurality of groups of locations of local expectation. The machine-learned attention model may include a plurality of attention layers, where each of the plurality of attention layers may include a plurality of attention heads, and where each of the plurality of attention heads is configured to apply the structured attention pattern. The structured attention pattern may include a partition tree having two or more hierarchical partition levels. The at least one of the attention heads may be configured to: for each of the one or more groups of locations with local expectation, normalize the individual local expectations for the group of locations; and normalize the one or more locations of direct expectation and the single group probabilities for the one or more groups of locations. The structured attention pattern may include a combiner-fixed attention pattern. The structured attention pattern may include a combiner-logsparse attention pattern. The model input may include natural language data. The model input may include image data, audio data, protein data, or computer-readable code data.

The structured attention pattern may specify a plurality of groups of locations of local expectation. The structured attention pattern may include a combiner-axial attention pattern. The structured attention pattern may include a machine-learned factorization plan that specifies the one or more locations of direct expectation and the one or more groups of locations of local expectation. Implementations of the described techniques may include hardware, a method or process, or computer software on a computer-accessible medium.

Another general aspect includes a computer-implemented method for performing an attention mechanism with reduced computational requirements. The computer-implemented method includes receiving a sequence of input data elements. The method also includes applying a structured attention pattern to each of the sequence of input data elements to generate a sequence of output data elements, where applying the structured attention pattern to each input data element may include: determining one or more locations of direct expectation and one or more groups of locations of local expectation; for each of the one or more locations of direct expectation, determining a direct expectation; and for each of the one or more groups of locations with local expectation: determining a single group probability for the group of locations; and determining an individual local expectation for each location in the group of locations. Other embodiments of this aspect include corresponding computer systems, apparatus, and computer programs recorded on one or more computer storage devices, each configured to perform the actions of the methods.

Implementations may include one or more of the following features. The computer-implemented method where the structured attention pattern has a support that covers an entirety of the sequence of input data elements. For at least one of the one or more groups of locations with local expectation, determining the individual local expectation for each location in the group of locations may include re-using the individual local expectation for each location in the group of locations that was previously computed for a different input data element in the sequence of input data elements. The sequence of input data elements may include a sequence of input embeddings. Implementations of the described techniques may include hardware, a method or process, or computer software on a computer-accessible medium. Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
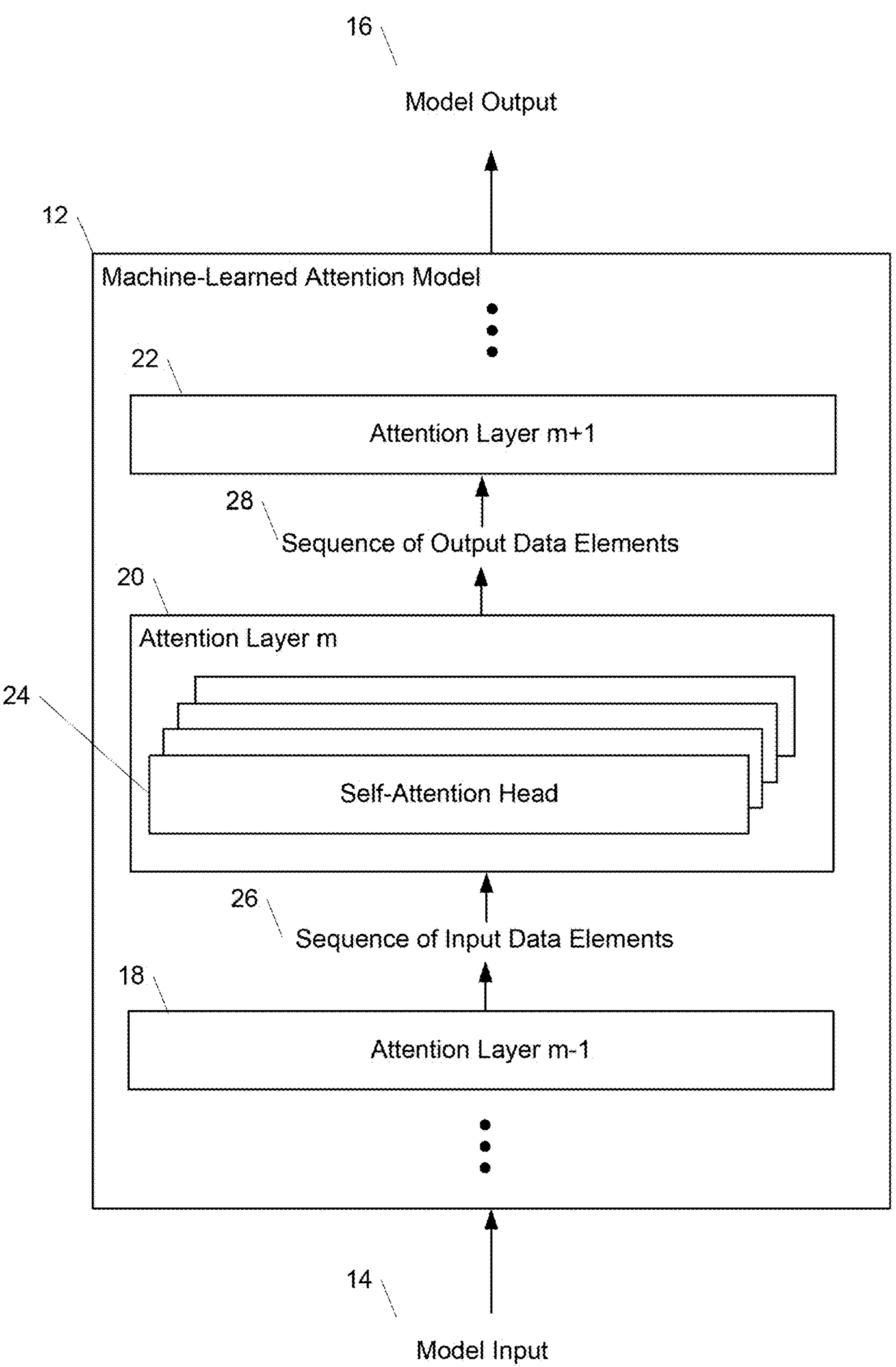
FIG. 1 depicts an example machine-learned attention model according to example embodiments of the present disclosure.

Reference numerals that are repeated across plural figures are intended to identify the same features in various implementations.

DETAILED DESCRIPTION

Overview

Generally, the present disclosure is directed to machine learning model architectures which provide full attention capability in each attention head while maintaining low computation and memory complexity. Specifically, according to one aspect of the present disclosure, example attention models provided herein can treat the self-attention mechanism as a conditional expectation over embeddings at each location and approximate the conditional distribution with a structured factorization. Each location can attend to all other locations, either via direct attention, or through indirect attention to group representations, which are again conditional expectations of embeddings from corresponding local regions. The present disclosure also provides specific example attention patterns for full attention which roughly correspond to certain sparse patterns used in existing sparse transformers and result in the same sub-quadratic cost $\mathcal{O}(L \log(L))$ or $\mathcal{O}(L\sqrt{L})$.

The systems and methods described herein (example implementations of which can be referred to as "Combiner") are a drop-in replacement for attention layers in existing transformers and can be easily implemented in common frameworks. Example experimental evaluations on both autoregressive and bidirectional sequence tasks and contained in U.S. Provisional Patent Application No. 63/220,063 demonstrated the effectiveness of this approach, yielding state-of-the-art results on several image and text modeling tasks.

More particularly, the present disclosure provides an improved attention mechanism which can be used as a drop-in replacement for the vanilla quadratic attention mechanism with sub-quadratic computation and memory cost. The proposed approach can still achieve full attention capability within each head of Multi-Head Attention, unlike approaches that adopt sparse or low-rank approximations. In particular, in some implementations, the standard attention computed at each location can be seen as the conditional expectation of the value embeddings at all feasible locations given the current location.

Based on such an understanding, the proposed attention mechanism explicitly approximates the conditional distribution through a structured factorization of the probability space. Specifically, given a location x, the probability of attending to location y can be either directly calculated via the query vector of x and key vector of y, or indirectly through a local group-based approach where x first attends to the key vector that represents a group of locations containing y, and then multiplying the probability of choosing y within that group. Example implementations of this approach can be referred to as Combiner since the conditional distributions in attention become a combination between several local attentions and direct attentions. This structured decomposition enables the proposed attention mechanism to take existing sparse attention patterns and convert them into corresponding design choices for probability factorizations that achieve full attention.

Example implementations of the present disclosure can achieve full attention with the same asymptotic complexity as sparse variants. The proposed attention mechanism can be easily implemented in most existing deep learning frameworks without the need for specialized hardware implementation and is GPU/TPU friendly. In fact, both the fixed and learnable sparse attention patterns from many existing Transformer variants can be enhanced with such structured factorizations, with the same order of time or memory cost.

Example experiments contained in U.S. Provisional Patent Application No. 63/220,063 validate Combiner on both autoregressive and bidirectional sequence modeling tasks over a variety of domains including text and images. The experiments show that Combiner can achieve better perplexity and accuracy when using the same transformer architectures while being much faster in terms of runtime, and achieves state of the art performance on density estimation on standard datasets CIFAR-10 (2.77 bits/dim) and ImageNet-64 (3.42 bits/dim), as well as the Long-Range Arena.

The systems and methods of the present disclosure provide a number of technical effects and benefits. As one example, the systems and methods of the present disclosure can enable full attention to be performed over long sequences with reduced computational cost, thereby resulting in savings of computational resources such as reduced memory usage, reduced processor usage, etc. The ability to perform full attention at reduced computational cost also provides for better performance (e.g., accuracy) from a machine-learned model in situations where a large input length previously foreclosed the use of full attention due to computational cost. Thus, the systems and methods of the present disclosure both improve the performance of the model and computer itself while also enabling conservation of computing resources.

With reference now to the Figures, example embodiments of the present disclosure will be discussed in further detail.

Example Attention Models

FIG. 1 depicts an example machine-learned attention model 12 according to example embodiments of the present disclosure. The example model 12 illustrated in FIG. 1 is both simplified for the purpose of illustration and also provided solely as an example. Other different architectures or arrangements of layers can be used without deviating from the scope of the present disclosure.

The machine-learned attention model 12 can be configured to receive and process a model input 14 to generate a model output 16. The model input 14 can be any form of data including raw textual or natural language data, textual or natural language embeddings, audio data, image data, sensor data, protein data, and/or other forms of data such as various sequences of data.

The machine-learned attention model 12 can include one or more attention layers (illustrated as example attention layers 18, 20, and 22). Some or all of the attention layers can include one or more attention heads. For example, attention layer 20 is shown as including four attention heads, including attention head 24. Any number of layers and/or heads can be used.

Some of all the attention heads (e.g., head 24) can be configured to receive a sequence of input data elements 26 and apply a structured attention pattern to the sequence of input data elements to generate a sequence of output data elements 28.

According to an aspect of the present disclosure, for each input data element in the sequence of input data elements, the structured attention pattern can specify one or more locations of direct expectation and one or more groups of locations of local expectation. Each group of groups of locations can contain any number of locations. The groups can be the same size (number of locations) or different sizes (numbers of locations).

The attention head 24 can apply the structured attention pattern as follows: For each of the one or more locations of direct expectation, the attention head 24 can determine a direct expectation. For each of the one or more groups of locations with local expectation, the attention head 24 can: determine a single group probability for the group of locations; and determine an individual local expectation for each location in the group of locations. The single group probability for a group can be determined for the group as a whole or a representative member of the group.

Figure 2:
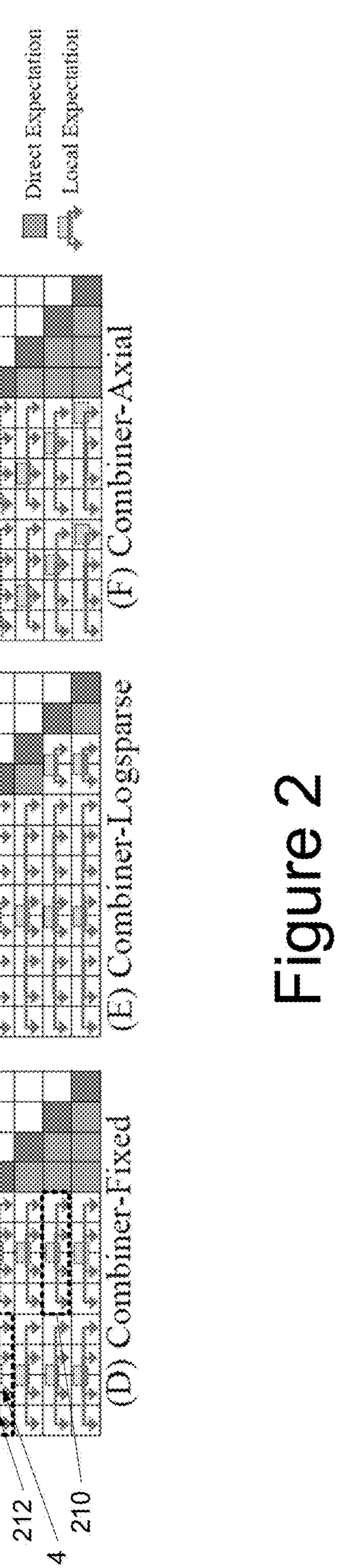
FIGS. 2A-F depict example attention patterns according to example embodiments of the present disclosure.

As examples of this approach, FIGS. 2A-F depict example attention patterns according to example embodiments of the present disclosure. In particular, FIGS. 2A-C shoe existing sparse attention patterns which have support over less than the full set of inputs. In contrast, FIGS. 2D-F show example structured attention patterns according to the present disclosure which provide full attention with support over an entirety of the set of inputs.

Referring to FIG. 2D as an example, the structured attention pattern 200 includes locations of direct expectation (e.g., locations 202, 204, and 206). The pattern 200 also includes groups of locations (e.g., groups 208 and 210). For example, group 208 contains four locations including, e.g., locations 212 and 214.

In one example, the attention output for a given input $x_i$ can be expressed as $A(x_i)=$ $$\underbrace{\sum_{j \in \Omega_i^0} \tilde{p}(j|i)v_j}_{\text{direct expectation}} + \sum\nolimits_{r=1}^{n_i} p(\Omega_i^r|i) \underbrace{\left( \sum_{j \in \Omega_i^r} p(j|\Omega_i^r)v_j \right)}_{\text{local expectation}},$$

where $$\Omega_i^0$$

denotes the set of locations with direct expectation and $$\Omega_i^r$$

denotes the different groups of locations with local expectation, with r being the index of the groups, and $v_j$ being the value of the jth location.

Thus, in some implementations, applying the structured attention pattern 200 to a given input $x_i$ can include computing a direct expectation for each location of direct expectation in $$\Omega_i^0$$

(e.g., 202, 204, 206, etc.), computing a single group probability for each $$\Omega_i^r$$

(e.g., group 208), and computing an individual local expectation for each location within one of the group of locations (e.g., a local expectation for location 212, a local expectation for location 214, etc.). The final attention can then be provided as shown in the expression above.

In some implementations, for example as shown in the expression above, the local expectation may not necessarily be dependent upon the value of $x_i$ and can therefore be re-used for multiple different input elements, thereby reducing the number of computations that need to be performed.

Attention as Conditional Expectation

This section revisits the formulation of the standard Transformer from the perspective of conditional expectation, which inspires the derivation of Combiner.

Without loss of generality, this disclosure uses for ease of description a single sequence in the self-attention scenario. Given a sequence of L embeddings $X=[x_1, x_2, \ldots, x_L]$, where $X \in \mathbb{R}^{L \times d}$ and each embedding $x_i \in \mathbb{R}^d$ is a d-dimensional vector, the core component of Transformer is the multi-head attention, where each head h is a scaled dot-product attention:

$$A_h(X) = softmax\left(\frac{Q_h}{\sqrt{d}}K_h^T\right)V_h, \quad \{Q_h = XW_h^Q, K_h = XW_h^K, V_h = XW_h^V\} \in \mathbb{R}^{L \times d}, \tag{1}$$

and the attention vector from each head $A_h(X)$ is concatenated and projected:

$$MultiHeadAttn(X) = [A_1(X), A_2(X), \ldots, A_H(X)]W^o, W^o \in \mathbb{R}^{Hd \times d}. \tag{2}$$

Here H is the total number of heads per Transformer layer. This disclosure describes how to approximate full attention within each head of multi-head attention. For ease of notation, we drop the head index h whenever possible, and use lower-case letters $x_i, q_i, k_i, v_i \in \mathbb{R}^d$ to denote rows in X, Q, K, V respectively, which corresponds to a location i in the original sequence of length L. We use [n] to denote the set of positive integers {1, 2, . . . , n}.

For a position $i \in [L]$, the attention formulation (1) can be viewed as conditional expectation of rows in V. Specifically, since softmax outputs a probability distribution, we can rewrite (1) as $$A(x_i) = \mathbb{E}_{p(j|i)}[v_j], \quad p(j|i) = \frac{1}{Z(x_i)}\exp\left(\frac{q_i}{\sqrt{d}}k_j^T\right), \tag{3}$$

where p(j|i) denotes the conditional probability at position j given the token at position i and the partition function $$Z(x_i) = \sum_{j \in \Omega_i} \exp\left(\frac{q_i}{\sqrt{d}}k_j^T\right)$$

over support $\Omega_i$. The support $\Omega_i$ of p(j|i) defines the set of valid locations that the i-th token can attend to. For instance, the support set in autoregressive language modeling (LM) consists of all previous tokens, i.e., $$\Omega_i^{LM} = [i];$$

in masked language modeling (MLM) the support consists of all tokens in the sequence, i.e., $$\Omega_i^{MLM} = [L].$$

That is, $$\Omega_i^{LM} \text{ and } \Omega_i^{MLM}$$

represent the full attention capability respectively in the LM and MLM setting.

Full Attention Via Structured Conditional Expectation

The complexity of p(j|i) is the bottleneck of the computation for $A(x_i)$. Generally, in existing sparse transformers, the support of p(j|i) is sparsified to reduce the computation and memory complexity, e.g., $$\Omega_i^{Sparse} \subsetneq \Omega_i^{LM}$$

for LM and $$\Omega_i^{Sparse} \subsetneq \Omega_i^{MLM}$$

for MLM, but this can lead to either reduced capacity or limited applicability. This section introduces the Combiner, which achieves $$\Omega_i^{Combiner} = \Omega_i^{LM}$$

for LM and $$\Omega_i^{Combiner} = \Omega_i^{MLM}$$

for MLM, while still maintaining sub-quadratic computation and memory cost. Below we denote $\Omega_i$ as the support for full attention if there is no ambiguity or need to distinguish between LM or MLM.

Local Factorization for Conditional Expectation

One main idea described herein is to exploit a hierarchical structure for conditional probability modeling in Eq. (3), which provides the opportunity for reducing computation complexity while maintaining the same support. Specifically, we introduce support variables $$\Omega_i^r,$$

for r=0, . . . $n_i$ and i∈[L]. The support variables are disjoint, i.e., $$\Omega_i^r \cap \Omega_i^s = \emptyset, \forall r \neq s, \text{ and } \bigcup_{r=0}^{n_i} \Omega_i^r = \Omega_i.$$

Then we can factorize p (j|i) as $$p(j|i) = \sum_{r=0}^{n_i} p(j, \Omega_i^r|i) = \sum_{r=0}^{n_i} p(j|\Omega_i^r, i) p(\Omega_i^r|i) = p(j|\Omega_i^{r_j}, i) p(\Omega_i^{r_j}|i), \quad (4)$$

where $r_j$ denotes the index of the support to which j belongs. The last equation arises from the fact that the $$\Omega_i^r$$

are disjoint from each other $$(\Omega_i^r \cap \Omega_i^s = \emptyset, \forall r \neq s).$$

Therefore, there is only one support, $$\Omega_i^{r_j},$$

containing j. The remaining terms, where $$j \notin \Omega_i^r$$

for $r \neq r_j$, are all zero since $$p(j \mid \Omega_i^r, i) = 0.$$

Furthermore, assume $$\Omega_i^{r_j}$$

is a sufficient statistic, i.e., j and i are independent given $$\Omega_i^{r_j},$$

we obtain $$p(j|i) = p(j|\Omega_i^{r_j}) p(\Omega_i^{r_j}|i). \quad (5)$$

Given the partition $$\{\Omega_i^r\}_{r=0}^{n_i},$$

the attention form in (3) can be rewritten as $$A(x_i) = \mathbb{E}_{p(j|i)}[v_j] = \sum_{r=0}^{n_i} \sum_{j \in \Omega_i^r} p(j, \Omega_i^r|i) v_j \quad (6)$$

$$= \underbrace{\sum_{j \in \Omega_i^0} \tilde{p}(j|i) v_j}_{\text{direct expectation}} + \sum_{r=1}^{n_i} p(\Omega_i^r|i) \underbrace{\left( \sum_{j \in \Omega_i^r} p(j|\Omega_i^r) v_j \right)}_{\text{local expectation}}, \quad (7)$$

where we consider direct attention in partition $$\Omega_i^0$$

and apply the local factorization (5) to the partition r=1, . . . , $n_i$. Here $\tilde{p}(j|i) \propto p(j|i)$ but with different normalization constants, which will be explained below. We refer to this model as Combiner since the structured attention (7) combines the direct expectation of $$\Omega_i^0$$

and multiple local expectations via $$p(j \mid \Omega_i^r) \text{ and } p(\Omega_i^r \mid i)$$

to form the final conditional expectation.

Equivalently, we can also rewrite the structured attention (7) as $$A(x_i) = \sum_{j \in \Omega_i} \underbrace{\left[ \mathbb{I}(j \in \Omega_i^0) \tilde{p}(j|i) + \sum_{r=1}^{n_i} \mathbb{I}(j \in \Omega_i^r) p(j|\Omega_i^r) p(\Omega_i^r|i) \right]}_{\text{the new effective conditional probability } q(j|i)} v_j, \quad (8)$$

where $\mathbb{I}(\cdot)$ is a binary indicator function. After reordering, one can see from (8) that we obtain the effective conditional probability q(j|i) that tries to approximate the original p(j|i). Each probability term depends on both current location i and other location j, and the expectation is still obtained with respect to a valid conditional probability (non-negative and sums up to 1 over $\Omega_i$).

Requirement for Sub-quadratic Cost. The benefit of this formulation can immediately be seen from the fact that the local expectation in (7) is independent of the position i. The full dependence is achieved via the multiplier $$p(\Omega_i^r \mid i)$$

where $$j \in \Omega_i^r.$$

If we can design the local factorization such that:

1. the order of number of terms in (7) for $$p(\cdot|i), \forall i \in [L]: \sum_{i=1}^{L}\left(n_i + \left|\Omega_i^0\right|\right)$$

is sub-quadratic; and 2. let $$\mathcal{U} = \{\Omega_i^r\}_{i\in[L], r\in[1,n_i]}$$

be the unique set of partitions used for local expectation calculation, then the order of $|\mathcal{U}|$ (i.e., the number of unique partitions in $\mathcal{U}$) is sub-quadratic;

3. the order of total number of unique calculations of local expectation across all locations in (7), $\sum_{\Omega\in\mathcal{U}}|\Omega|$ is sub-quadratic;

Then, one can see that the overall computation and memory cost will be sub-quadratic with full attention support $$\Omega_i^{Combiner} = \Omega_i, \forall i \in [L].$$

Remark (Further Hierarchical Decomposition): The local decomposition with a one layer partition of support of p(•|i) is introduced for simplicity. In fact, such local decompositions can be stacked further, which introduces a partition tree. Specifically, we can further partition $$\Omega_i^r$$

with disjoint subsets $$\left\{\Omega_i^{rk}\right\}_{k=1}^{n_r},$$

and consider local decomposition $$p(j, \Omega_i^r|i) = p\left(j\middle|\Omega_i^{rk_j}, i\right)p\left(\Omega_i^{rk_j}|\Omega_i^r, i\right)p(\Omega_i^r|i),$$

where $k_j$ is the index of sub-region which j belongs to. Thus, we obtain a hierarchical decomposition of p(j|i), which can also be plugged to (6) and yield a new full attention formulation.

Parameterizing Conditional Probabilities

While we obtained a possible way to speed up the standard Transformer via a combination of direct expectation and local expectations, it is also beneficial to have an efficient design choice for the probability terms in (7), namely $\tilde{p}$(j|i) from direct expectation, $$p(j \mid \Omega_i^r)$$

from local expectation and $$p(\Omega_i^r \mid i) \text{ for } r \in [1, n_i].$$

For simplicity and as an example, one can use the scaled dot-product, which means that we will associate positions i,j and variable sets $$\Omega_i^r$$

with the corresponding embedding representation, and thus the probability is proportional to the exponential of the embedding inner products. Specifically:

$\tilde{p}$(j|i): As this term is for the direct expectation, we can let $$\tilde{p}(j|i) \propto \exp\left(\frac{q_i}{\sqrt{d}}k_j^\top\right),$$

which is the same as vanilla attention (3) but with different normalizations, which will be explained in Equation 9.

$$p(\Omega_i^r \mid i):$$

This term aims to capture the joint event probability, $$\text{i.e., } p(\Omega_i^r|i) \propto \exp\left(\frac{q_i}{\sqrt{d}}k_{\Omega_i^r}^\top\right).$$

Thus the design choice of $$k_{\Omega_i^r}$$

should make an abstraction of the corresponding support $$\Omega_i^r.$$

We find $$k_{\Omega_i^r} = \max\ \text{pooling}_{j\in\Omega_i^r} k_j$$

already provides good empirical results without introducing additional parameters; we can also use DeepSets [32] to obtain such abstraction.

$$p(j \mid \Omega_i^r):$$

This term is the probability of getting j within this local span $$\Omega_i^r.$$

We make $$p(j|\Omega_i^r) \propto \exp\left(\frac{q_{\Omega_i^r}}{\sqrt{d}} k_j^\top\right),$$

where we use max pooling or DeepSets over $$\{q_j\}_{j \in \Omega_i^r}$$

to obtain $$q_{\Omega_i^r}$$

similarly.

Normalizing Probability Terms. The terms in each local expectation $$p(j \mid \Omega_i^r), \forall\, j \in \Omega_i^r$$

can be normalized within the local span; the direct expectation $\tilde{p}(j|i)$ and the terms in $$p(\Omega_i^r \mid i)$$

can be normalized together, $$Z(x_i) = \sum_{j \in \Omega_i^{(0)}} \exp\left(\frac{q_i}{\sqrt{d}} k_j^\top\right) + \sum_{r=1}^{n_i} \exp\left(\frac{q_i}{\sqrt{d}} k_{\Omega_i^r}^\top\right), \tag{9}$$

and $Z(x_i)$ is the normalizing constant when calculating $\tilde{p}(j|i)$ and $$p(\Omega_i^r \mid i).$$

Example Trade-Offs

Combiner achieves full attention with reduced cost without making explicit sparsity or low-rank assumptions over the attention matrix. However this efficiency gain is not free. This section discusses the limitations of the simplification made by Combiner, and provides a simple workaround.

Structured Attention Approximation

We obtain the local decomposition (5) under the conditional independence assumption. Therefore, the local expectation in (7) is independent of the position i, this suggests that any two locations $i_1$ and $i_2$ with $$\Omega_{i_1}^r = \Omega_{i_2}^r = \Omega$$

would have linearly dependent attention scores over the region Ω. Formally, the probabilities formed by the effective conditional distribution $$\vec{a}(\Omega)_{i_1} = q\left[(j_1|i_1), q(j_2|i_1), \ldots, q\left(j_{|\Omega_{i_1}^r|}|i_1\right)\right] = \frac{p(\Omega_{i_1}^r \mid i_1)}{p(\Omega_{i_2}^r \mid i_2)} \vec{a}(\Omega)_{i_2}.$$

In other words, the rank of the sub-matrix over the same partition in the resulting attention matrix is 1, therefore, the attention matrix is locally low-rank based on the partition. On the other hand, the direct expectation fully attends to each position in sub-support $\Omega_0$, which ensures the full-rank block. These two attention schemes make the attention matrix of Combiner structured. Compared with low-rank approximation for attention, a structured approximation that exploits both the locally low-rank and full-rank blocks has been proved more powerful theoretically and empirically in large-scale kernel machines.

Improving Expressiveness Using a Mixture Model

One way to further improve the expressiveness of the local factorization is to use a mixture model. This idea obtains high-rank softmax layer in language modeling. Let ω be a certain partition of the support (i.e., collection of $$\Omega_i^r)$$

of $\Omega_i$, then one can easily use $$A(x_i) = \frac{1}{M} \sum_{m=1}^{M} A(x_i; \omega_m)$$

to compute the attention, where each component of the mixture $A(x_i; \omega_m)$ is the term (7) using a specific factorization plan $\omega_m$. Empirically it was found that two components are already sufficient to improve performance.

Example Instantiations

This section shows several example local factorization schemes satisfying the requirements described herein. As shown, Combiner is able to convert several sparse transformers into full attention, with the same order of computation and memory consumption. One can also design other factorization patterns, which can be easily instantiated in Combiner.

Combiner-Fixed

The Sparse Transformer is one of the most representative variants that can achieve $\mathcal{O}(L\sqrt{L})$ computation and memory cost with sparse attention. See Rewon Child, Scott Gray, Alec Radford, and Ilya Sutskever. Generating long sequences with sparse transformers. arXiv preprint arXiv:1904.10509, 2019.

Here it is shown how to convert a fixed pattern into a factorization plan, and instantiate a full attention variant named the Combiner-Fixed (FIG. 2D).

In the fixed-sparse attention, the support is $$\Omega_i^{sparseMLM} = \{j : j \bmod s = 0\} \cup \{j : j \equiv i(div\, s)\}$$

where s is a hyper-parameter, div is integer division, and j≡i (div s) denotes that the quotients of i and j w.r.t. s are the same. In the autoregressive case, $$\Omega_i^{sparseLM} = \Omega_i^{sparseMLM} \cap [i].$$

Please refer to FIG. 2A for an illustration of the LM version.

Our design of $$\omega_{fixed}^{MLM}$$

has the following form:

$$\Omega_i^0 = \{j : j \equiv i(div\, s)\}, \quad (10)$$

$$\Omega_i^r = \{j : j\, div\, s = r,\ j \notin \Omega_i^0,\ \forall\, r \in [L\, div\, s],\ \forall\, i \in [L]$$

where each local expectation is performed in each span of size s, and there are totally L div s spans across all locations. For each position i∈[L], there are (s+(L div s)) terms in (7); the local expectation has (L div s) terms. The overall complexity is $\mathcal{O}\cdot$(s+2(L div s))). The optimal s is $\mathcal{O}(\sqrt{L})$, and we can achieve $\mathcal{O}(L\sqrt{L})$ computation and memory complexity, which is the same as [14] but here we gain full attention capability in each attention head. For the LM case, we can simply have $$\omega_{fixed}^{LM} : \{\Omega_i^r \cap [i] \mid \Omega_i^r \in \omega_{fixed}^{MLM}\},$$

which has the same $\mathcal{O}(L\sqrt{L})$ optimal complexity.

Combiner-Logsparse

The Logsparse Transformer is proposed in Shiyang Li, Xiaoyong Jin, Yao Xuan, Xiyou Zhou, Wenhu Chen, Yu-Xiang Wang, and Xifeng Yan. Enhancing the locality and breaking the memory bottleneck of transformer on time series forecasting. In Advances in Neural Information Processing Systems (NeurIPS), 2019.

The Logsparse Transformer can theoretically achieve $\mathcal{O}$(L log L) cost. The general idea is to make the size of support $$\Omega_i^{sparse}$$

no larger than $\lceil \log_2 i \rceil$. For the ease of notation, we first define bits(n)=[$b_1$, $b_2$, . . . , $\lceil b_{\log_2 n} \rceil$] to be the binary representation of integer n, with $b_t \in \{0, 1\}$ the coefficient of basis $2^t$. Thus we have $$n = \sum_{t=1}^{\lceil \log_2 n \rceil} b_t * 2^t.$$

One of the possible design choices to make Logsparse in the LM case is $$\Omega_i^{sparseLM} = \left\{ suff_t := \sum_{\tau=t}^{\lceil \log_2 i-1 \rceil} b_\tau * 2^\tau \right\}_{t=1}^{\lceil \log_2 i-1 \rceil} \cup \{i\},$$

i.e., attend to the location indices that equal to the suffix sum of the weighted bits(i−1), as well as location i itself. This serves as our base sparse version as shown in FIG. 2B.

To exploit this scheme in the Combiner framework, we can define $\lceil \log_2 n \rceil$ non-overlapping supports, where $$\Omega_i^r = [suff_r] \setminus [suff_{r+1}]$$

with the boundary case $[suff_{\lceil \log_2 i-1 \rceil+1}] = \emptyset$. Note that for the ease of notation, some of the $$\Omega_i^r$$

are empty which will be ignored. In this case, the direct attention set $$\Omega_i^0$$

includes i, as well as {i−1} when i is an even number. Such a factorization leads to Combiner-Logsparse, as shown in FIG. 2E. From the Figure, we observe that in total we will have span summaries for every 2, 4, 8, . . . , $2^{\lfloor \log_2 L \rfloor}$ locations, resulting in total $$\sum_{t=1}^{\lfloor \log_2 L \rfloor} \left\lfloor \frac{L}{2^t} \right\rfloor \text{ or } \mathcal{O}(L)\ s$$

summaries. Each location i will select at most $\mathcal{O}$(log(i)) non-overlapping spans to cover the full support $\Omega_i$, and thus, the total cost will be $\mathcal{O}$(L log L).

Combiner-Axial

The Axial Transformer is described at Jonathan Ho, Nal Kalchbrenner, Dirk Weissenborn, and Tim Salimans. Axial attention in multidimensional transformers. arXiv preprint arXiv:1912.12180, 2019.

The Axial Transformer builds the attention along each axis of the input data. Without loss of generality, we focus on 2D case where the input sequence is reshaped into a matrix of size n×m=L. Specifically, the location i in original sequence will be in $row_i$=(i−1) div m+1 and $col_i$=(i−1) mod m+1. We show how to simply enable full attention with factorization on 2D matrix, hence Combiner-Axial.

The sparse axial has $$\Omega_i^{sparseMLM} = \{j : j-1 \equiv i-1 (\bmod m)\} \cup \{j : j-1 \equiv i-1 (div\, m)\},$$

$$\text{and } \Omega_i^{sparseLM} = \Omega_i^{sparseMLM} \cap [i],$$

which all have at most O(m+n) entries for each i, as illustrated in FIG. 2C. We propose several factorization schemes to make it an attention with full support.

$$\omega^{LM}_{axial-vertical}:\Omega^0_i=\Omega^{sparseLM}_i,$$

$$\text{and } \Omega^r_i=\{j:j\equiv r(\bmod m)\}\cap[i-col_i], \text{ for } r\in[m]\backslash col_i.$$

As depicted in FIG. 2A, $$\Omega^r_i$$

corresponds to the column r above $row_i$, where we use max pooling to obtain the abstraction. To obtain such abstraction for all the locations, we can leverage the cummax operator for each column to efficiently obtain the prefix-max.

$$\omega^{LM}_{axial-horizontal}:$$

similar as $\omega_{axial\text{-}vertical}$ except that each $$\Omega^r_i$$

summarizes the row r before $row_i$ and excludes $col_i$ FIG. 2B.

$$\omega^{LM}_{axial-rowmajor}:\Omega^0_i=j:j-1\equiv i-1(divm)\cap[i],$$

i.e., elements in the same row are directly attended, while $$\Omega^r_i=\{i:j\equiv r(divm)\}\cap[i-col_i]$$

captures the rows before $row_i$. This structure is similar to Combiner-Fixed, except for the way that the abstraction (and thus the local expectation) is computed. Combiner-Fixed computes the abstraction only based on r of partition $$\Omega^r_i,$$

where to $\omega_{axial\text{-}rowmajor}$ depends on both r and the column $col_i$ (FIG. 2F)).

In all cases above, the cost is similar to the Axial Transformer, which is $O(L\sqrt{L})$ if we reshape the sequence to a 2D matrix with n, $m=O(\sqrt{L})$.

Combiner-Learnable

Another example implementation can also learn the factorization plan co from the data. We illustrate this with Routing Transformer and provide a way to enable full attention in Routing Transformer following the Combiner principle.

For a specific layer, suppose we have a learned disjoint region (or cluster in Routing Transformer)

$$\{\Omega^r\}^n_{r=1}$$

where $\cup_r\Omega^r=[L]$. In Routing Transformer, we simply have $$\Omega^{sparseMLM}_i=\Omega^{r_i}$$

where $\Omega^{r_i}$ denotes the region where position i belongs to. To define the Combiner factorization, we let $$\omega_{routingMLM}:\Omega^0_i=\Omega^{r_i},\ \Omega^r_i=\Omega^r\Big\backslash\Omega^0_i,\ \forall\ r\in[n_i]. \quad (11)$$

Note that $n_i=n$ (, number of learned clusters) for all locations. The above factorization can only work for MLM. LM requires the following definition:

$$\omega_{routingLM}:\Omega^0_i=\Omega^{r_i}\cap[i],\ \Omega^r_i=\left(\Omega^r\Big\backslash\Omega^0_i\right)\cap[i],\ \forall\ r\in[n_i]. \quad (12)$$

In general, both LM and MLM can have sub-quadratic cost when $n=O(\sqrt{L})$. However, routing variants (including the Routing Transformer) require a gather operation, which can be slow on TPUs. Routing Transformer is described at Aurko Roy, Mohammad Saffar, Ashish Vaswani, and David Grangier. Efficient content-based sparse attention with routing transformers. Transactions of the Association for Computational Linguistics, 9:53-68, 2021.

Example Devices and Systems

Figure 3A:
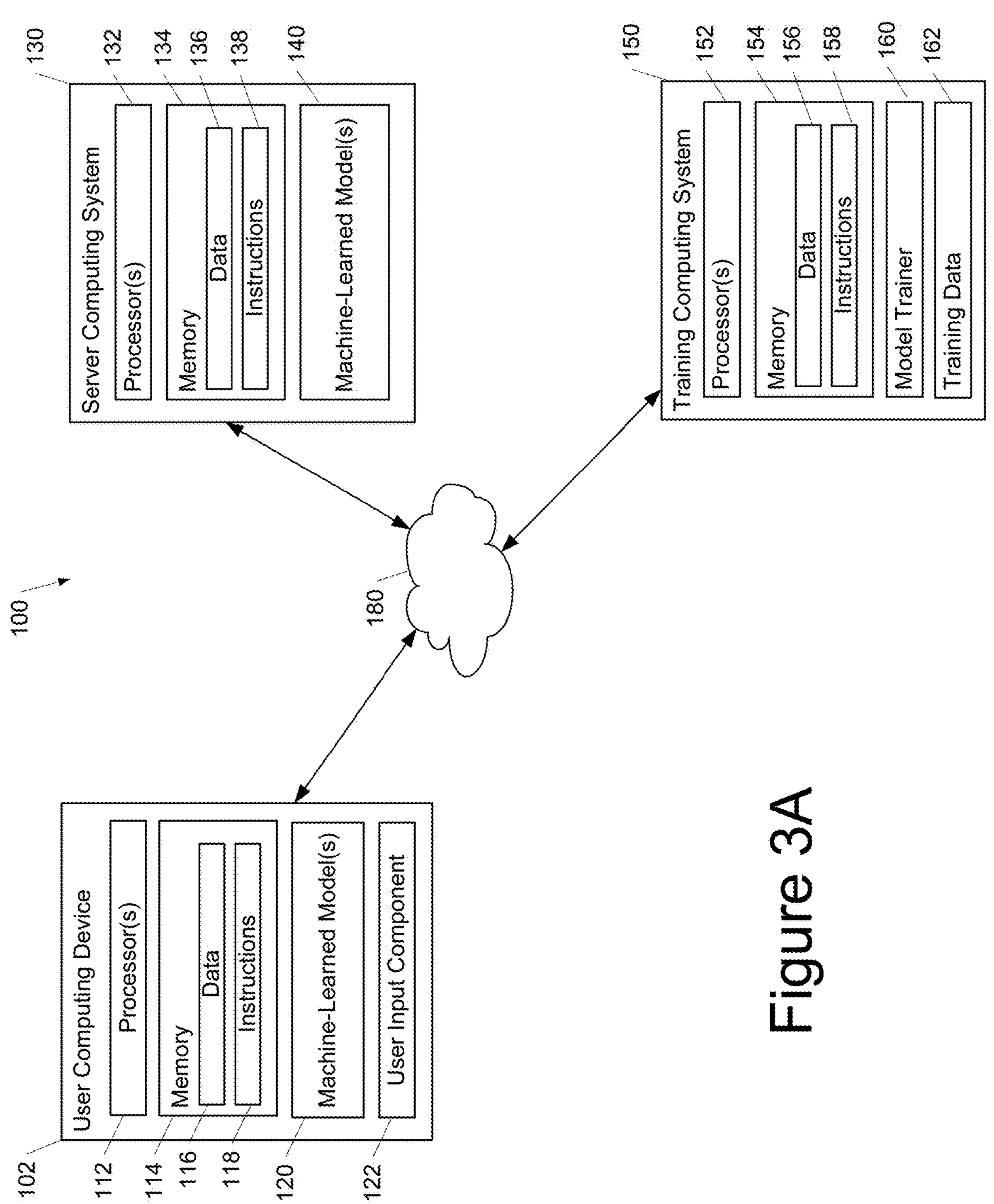
FIG. 3A depicts a block diagram of an example computing system according to example embodiments of the present disclosure.

FIG. 3A depicts a block diagram of an example computing system 100 that can perform full attention with reduced computational cost according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-2F.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel processing across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-2F.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
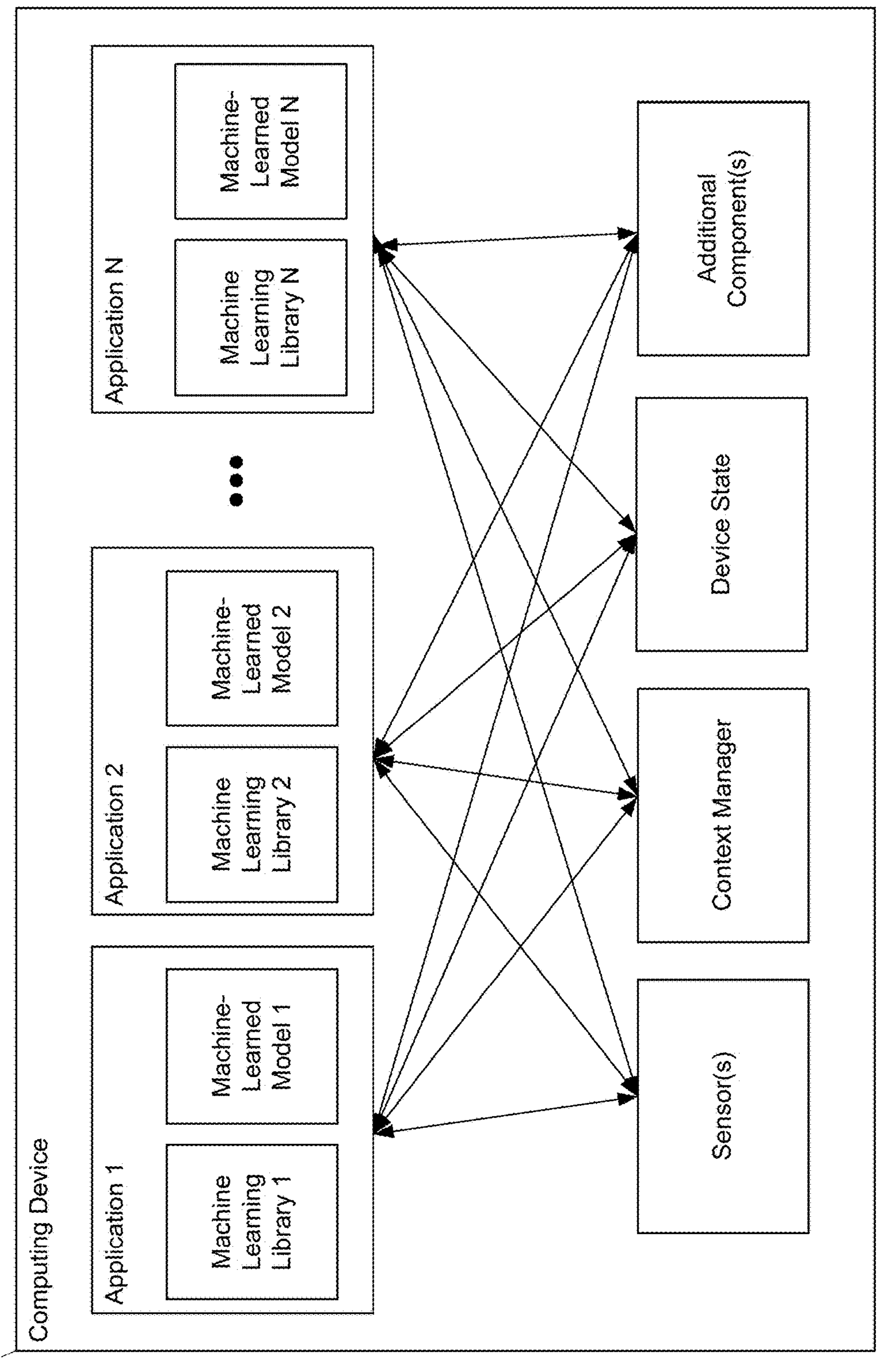
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
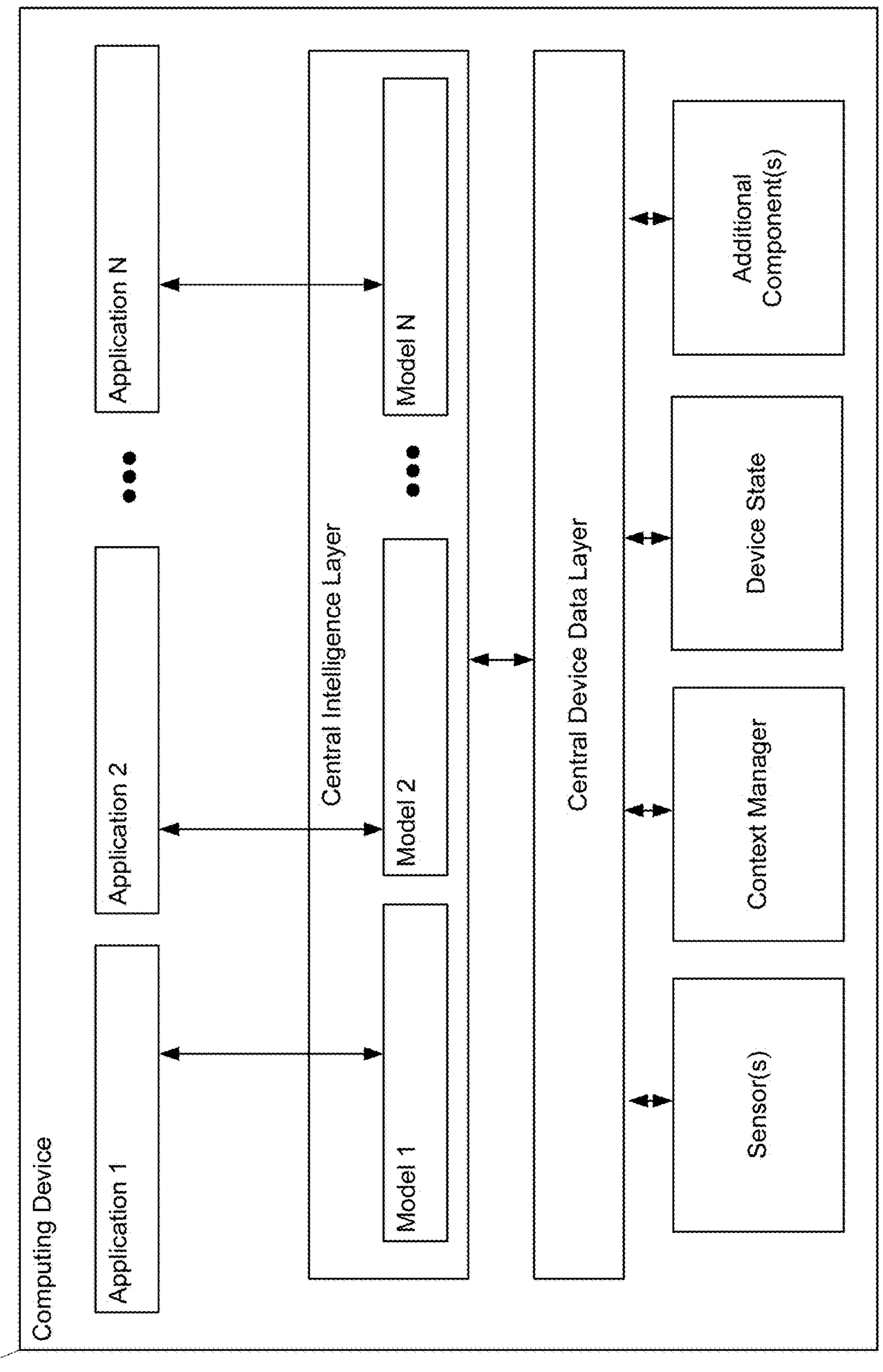
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing an attention mechanism with reduced computational requirements, the computing system comprising:

one or more processors; and one or more non-transitory computer-readable media that collectively store a machine- learned attention model configured to receive and process a model input to generate a model output, wherein the machine-learned attention model comprises one or more attention layers, wherein at least one of the attention layers comprises one or more attention heads, and wherein at least one of the attention heads is configured to:

receive a sequence of input data elements; and apply a structured attention pattern to the sequence of input data elements to generate a sequence of output data elements;

wherein, for each input data element in the sequence of input data elements, the structured attention pattern specifies one or more locations of direct expectation and one or more groups of locations of local expectation; and wherein, for each of the one or more groups of locations with local expectation, the at least one of the attention heads is configured to:

determine a single group probability for the group of locations; and determine an individual local expectation for each location in the group of locations.

2. The computing system of claim 1, wherein the structured attention pattern comprises a full attention pattern that has a support that covers an entirety of the sequence of input data elements.

3. The computing system of claim 1, wherein the sequence of input data elements comprises a sequence of input embeddings.

4. The computing system of claim 1, wherein the structured attention pattern specifies a plurality of groups of locations of local expectation.

5. The computing system of claim 1, wherein the machine-learned attention model comprises a plurality of attention layers, wherein each of the plurality of attention layers comprises a plurality of attention heads, and wherein each of the plurality of attention heads is configured to apply the structured attention pattern.

6. The computing system of claim 1, wherein the structured attention pattern comprises a partition tree having two or more hierarchical partition levels.

7. The computing system of claim 1, wherein the at least one of the attention heads is configured to:

for each of the one or more groups of locations with local expectation, normalize the individual local expectations for the group of locations; and normalize the one or more locations of direct expectation and the single group probabilities for the one or more groups of locations.

8. The computing system of claim 1, wherein the structured attention pattern comprises a combiner-fixed attention pattern.

9. The computing system of claim 1, wherein the structured attention pattern comprises a combiner-logsparse attention pattern.

10. The computing system of claim 1, wherein the structured attention pattern comprises a combiner-axial attention pattern.

11. The computing system of claim 1, wherein the structured attention pattern comprises a machine-learned factorization plan that specifies the one or more locations of direct expectation and the one or more groups of locations of local expectation.

12. The computing system of claim 1, wherein the model input comprises natural language data.

13. The computing system of claim 1, wherein the model input comprises image data, audio data, protein data, or computer-readable code data.

14. A computer-implemented method for performing an attention mechanism with reduced computational requirements, the method comprising:

receiving a sequence of input data elements; and applying a structured attention pattern to each of the sequence of input data elements to generate a sequence of output data elements, wherein applying the structured attention pattern to each input data element comprises:

determining one or more locations of direct expectation and one or more groups of locations of local expectation; and for each of the one or more locations of direct expectation, determining a direct expectation; and for each of the one or more groups of locations with local expectation:

determining a single group probability for the group of locations; and determining an individual local expectation for each location in the group of locations.

15. The computer-implemented method of claim 14, wherein the structured attention pattern has a support that covers an entirety of the sequence of input data elements.

16. The computer-implemented method of claim 14, wherein, for at least one of the one or more groups of locations with local expectation, determining the individual local expectation for each location in the group of locations comprises re-using the individual local expectation for each location in the group of locations that was previously computed for a different input data element in the sequence of input data elements.

17. The computer-implemented method of claim 14, wherein the sequence of input data elements comprises a sequence of input embeddings.

18. The computer-implemented method of claim 14, wherein the structured attention pattern specifies a plurality of groups of locations of local expectation.

19. One or more non-transitory computer-readable media for performing an attention mechanism with reduced computational requirements, wherein the one or more non-transitory computer-readable media collectively store:

a machine-learned attention model configured to receive and process a model input to generate a model output, wherein the machine-learned attention model comprises one or more attention layers, wherein at least one of the attention layers comprises one or more attention heads, and wherein at least one of the attention heads is configured to:

receive a sequence of input data elements; and apply a structured attention pattern to the sequence of input data elements to generate a sequence of output data elements;

wherein, for each input data element in the sequence of input data elements, the structured attention pattern specifies one or more locations of direct expectation and one or more groups of locations of local expectation; and wherein, for each of the one or more groups of locations with local expectation, the at least one of the attention heads is configured to:

determine a single group probability for the group of locations; and determine an individual local expectation for each location in the group of locations.

* * * * *